United States Patent

Krekel et al.

[11] Patent Number: 5,837,051
[45] Date of Patent: Nov. 17, 1998

[54] PROCESS FOR THE THERMAL TREATMENT OF IRON OXIDES IN A CIRCULATING FLUIDIZED BED

[75] Inventors: Jörg Krekel, Essen; Berndt-Ullrich Köhler, Krefeld; Horst Brunn, Meerbusch, all of Germany

[73] Assignee: Bayer AG, Leverkusen, Germany

[21] Appl. No.: 571,726

[22] Filed: Dec. 13, 1995

[30] Foreign Application Priority Data

Dec. 27, 1994 [DE] Germany .......................... 44 46 873.3
Aug. 14, 1995 [DE] Germany ........................ 195 29 864.0

[51] Int. Cl.$^6$ ...................................................... C09C 1/22
[52] U.S. Cl. .......................... 106/456; 106/459; 423/632; 423/633; 423/636
[58] Field of Search ................... 106/456, 459; 423/632, 633, 636

[56] References Cited

U.S. PATENT DOCUMENTS

| | | | |
|---|---|---|---|
| 4,076,796 | 2/1978 | Reh et al. | 423/659 |
| 4,082,905 | 4/1978 | Stephan et al. | 428/538 |
| 4,701,221 | 10/1987 | Brunn et al. | 106/304 |
| 4,946,505 | 8/1990 | Jungk | 106/712 |
| 4,966,641 | 10/1990 | Westerhaus et al. | 106/456 |
| 5,002,609 | 3/1991 | Rademachers et al. | 106/456 |
| 5,013,635 | 5/1991 | Rademachers et al. | 106/456 |

FOREIGN PATENT DOCUMENTS

| | | |
|---|---|---|
| 0 249 843 | 12/1987 | European Pat. Off. . |
| 0 396 975 | 11/1990 | European Pat. Off. . |
| 0 419 964 | 4/1991 | European Pat. Off. . |
| 25 24 540 | 12/1976 | Germany . |
| 26 17 568 | 11/1977 | Germany . |

OTHER PUBLICATIONS

Perry's Chemical Engineers' Handbook, 5th ed., McGraw–Hill, NY, pp. 20–17, 18, 70 74 and 75, Dec. 1984.
Orbit Abstract of DE 25 24 540 (Dec. 23, 1976).
Orbit Abstract of EP 0 396 975 (Nov. 14, 1990).
Orbit Abstract of EP 0 419 964 (Apr. 3, 1991).
Orbit Abstract of EP 0 249 843 (Dec. 23, 1987).
Orbit Abstract of DE 26 17 568 (Nov. 3, 1977).
Orbit Abstract of DE 26 25 106 (Dec. 15, 1977).
Orbit Abstract of DE 39 10 783 (Oct. 11, 1990).
Orbit Abstract of DE 35 18 093 (Nov. 27, 1986).
Orbit Abstract of DE 36 19 363 (Dec. 10, 1987).
Orbit Abstract of DE 39 10 779 (Oct. 11, 1990).
Printzen, et al., Pigmente, anorganische; Buntpigmente, Band 18, pp. 599–628 (No Date).
Orbit Abstract of DE 36 20 333 (Dec. 23, 1987).

Primary Examiner—Mark L. Bell
Assistant Examiner—Scott L. Hertzog
Attorney, Agent, or Firm—Connolly & Hutz

[57] ABSTRACT

The present invention relates to a process for the production of iron oxide brown, red and black pigments and to the use thereof.

17 Claims, No Drawings

PROCESS FOR THE THERMAL TREATMENT OF IRON OXIDES IN A CIRCULATING FLUIDIZED BED

The present invention relates to a process for the production of iron oxide brown, red and black pigments and to the use thereof.

Iron oxide pigments consist of oxides of trivalent or di- and trivalent iron with a maghemite, hematite or magnetite structure. They are produced either using the one- or two-stage precipitation process from iron(II) salt solutions, as described for example in DE-A 2 617 568, (G.B. 1,534,953) or using the Laux process by reducing nitrobenzene with metallic iron (*Ullmanns Encyklopädie der technischen Chemie*, 4th edition, volume 18, page 603, Verlag Chemie, Weinheim 1979 and DE-C 518 929). Powdery iron oxide black may be stabilised (against oxidation) by chemical post-treatment, as described in DE-C 2 625 106 (U.S. Pat. No. 4,966,641). This post-treatment does indeed stabilise the pigment. Since it does however somewhat impair its colour properties and does not have a positive effect on the environmental properties of the pigment, a process, as described in DE-A 3 620 333, was developed for the thermal treatment of black pigments in a rotary kiln under inert conditions. A further improvement of this process, wherein the heat treatment is performed not under inert, but slightly oxidising conditions, is described in DE-A 3 910 783 (U.S. Pat. No. 5,013,365).

The aqueous treatment described in DE-A 3 518 093 (U.S. Pat. No. 4,701,221) of pastes substantially consisting of iron and oxygen and originating from effluents from washing, filtration, solid/liquid separation operations and from defective batches etc. hereinafter referred to as effluent pastes) also leads to a distinct improvement in the quality of the finished product.

Conventionally, iron oxide pigments, which occur during the course of production as intermediates in the aqueous phase in the form of filter cakes, once dried, are ground more or less thoroughly, depending upon the application.

Although iron oxide pigments are generally used in this powdery form, they still have disadvantages as they tend to produce dust and are difficult to dispense.

For this reason, it is suggested in DE-A 3 619 363 (U.S. Pat. No. 4,946,505) to use pigment granules, to which disperants had been added, to colour concrete.

DE-A 3 910 779 (U.S. Pat. No. 5,002,609) proposes the granulation of iron oxide black pigment without adding binder and to achieve the necessary granule strength by thermal treatment at elevated temperature in a rotary kiln (400° to 800° C.). By this means, the colour properties, stability and environmental properties of the pigments are improved.

The rotary kiln described above has several advantages and disadvantages. The advantages include simple solid transport, straightforward mixing of products in various states, tried and tested technology and, above all, a readily controllable minimum residence time.

A disadvantage may be considered to be that the operating costs for thermal treatment in a rotary kiln are very high as a very large unit having elevated heat losses is necessary for the production of relatively large quantities of pigment (5 to 15 t/h). Due to the moving parts, sealing, for example under inert or particularly reducing conditions, is very costly. The compact charge which passes along the floor of the rotary kiln results in a wide temperature and atmospheric environment distribution of the individual product grains. This leads to non-uniform product properties and to difficulties in establishing the atmosphere as, due to the poor gas exchange, no equilibrium is established between the product and the atmosphere. Moreover, relatively large quantities of fines are discharged, which must be collected in a costly dust separator (electrostatic gas cleaner).

Furthermore, the described thermal post-treatments may be used only under very limited conditions: generally, they are designed only for heat treatment of virtually stoichiometric magnetites. Thus, neither are effluent pastes used (an often undefined and variable mixture of various iron oxide and iron oxyhydroxide pastes with contents of extraneous elements (Mn, Si, S, Cl, C etc.) of up to 10 wt. % which originates from working up, washing or other processing stages), nor is the production of brown pigments (maghemite) or red pigments (hematite) from these starting materials taken into account.

In order to entirely or partially overcome the disadvantages of rotary kiln processes, it is conceivable to perform thermal treatments in other plants. Thus, for example, a stationary fluidised bed could be used, which promises major advantages with regard to economic viability and moderation of the thermal and atmospheric stresses to which individual particles are exposed. However, this approach is bound to fail from the very outset as, due to the very wide particle size distribution of the starting agglomerate, fluidising the coarser fractions will result in the discharge of a substantial quantity of the fines (see comparative example 4).

When using a circulating fluidised bed, as described in DE-A 2 524 540 (U.S. Pat. No. 4,076,796), for reducing iron ore to magnetite, solid, crystalline particles of a size in the order of 20–300 $\mu$m with sufficiently high abrasion resistance are required. The fine fraction (<20 $\mu$m) is discharged together with the exhaust gas due to the high fluidising velocities. Pigments with particle sizes of <10 $\mu$m cannot therefore be used. Due to the high quantities of binder required, pigment granules of the kind described in EP-A 396 975 produce undesired side-effects, such as sintering, partial reduction, etc., all of which have a negative effect on the colouring properties of the pigments.

The object of the invention was thus to provide universally applicable iron oxide black, brown and red pigments from the starting materials—black paste, yellow paste as well as mixed valency effluent paste—which pigments are stable (in terms of storage, transport and weathering), are environmentally and colorimetrically improved, which do not exhibit the stated disadvantages, together with an economic process with which these iron oxide pigments may be obtained.

It has surprisingly now been found that this object may be completely satisfactorily achieved if compounds substantially consisting of iron(II), iron(III) or mixed valency iron(II, III) oxides, hydroxides or oxyhydroxides are treated under suitable conditions in a circulating fluidised bed.

The present invention provides a process for the production of iron oxide pigments from the group comprising (alpha-, gamma-) $Fe_2O_3$ and $Fe_3O_4$ from corresponding starting suspensions, whose primary particles have an average diameter of $\leq 10$ $\mu$m and which are produced by a) reacting iron salt solutions with alkaline compounds and oxidation (precipitation process)

b) by oxidising metallic iron with compounds containing oxygen (Penniman process), c) by oxidation with nitrobenzene (nitrobenzene reduction process)

d) by roasting iron salts (Coperas process) and subsequently forming a slurry in water or e) by separating and working up by-products or wastes (effluent paste) substantially consisting of iron/iron compounds and oxygen, optional washing and subsequent thermal treatment, which process is characterised in that the material obtained from processes a) to e) is agglomerated to an average particle size of 0.05 to 10 mm without any additional binder and the thermal treatment of the agglomerated material then proceeds in a heated apparatus in which the material is fluidised by an upwardly directed gas mixture in such a manner that a gas/solid flow is formed (fluidised bed), the resultant gas/solid mixture flows from the bottom upwards through the apparatus and is separated into gas and solid components in a second, down-stream apparatus, for example in a cyclone, wherein a proportion of the solid stream is discharged and the remaining material is returned to the heated apparatus (circulating fluidised bed).

A proportion of the gas mixture, optionally after further treatment (for example filtration, cleaning etc.) is preferably recirculated.

A suitable agglomerate is preferably produced by spraying or atomisation, for example in a spray or venturi drier.

Agglomeration may also be performed by granulating with the addition of water, by compacting processes or by both processes, optionally using a liquid fuel (e.g. paraffin or heating oil) as a binder.

An agglomerate with an average particle size of 0.1 to 1 mm is preferably introduced into the circulating fluidised bed.

Average particle size may be determined, for example, by light scattering measurements, centrifugal separation or screening.

The gas/solid ratio in the heated apparatus is advantageously adjusted to 100 to 1,300 $Nm^3$/t of pigment ("$Nm^3$" as used herein means a normal cubic meter at 0° C. and 1 bar pressure and "t" means a metric ton).

The superficial gas velocity in the heated apparatus is preferably adjusted to between 0.5 and 6 m/s.

An average residence time of the solid in the system preferably of between 5 and 40 minutes results in very economic production of products with acceptable properties.

The minimum average residence time of the solid in the system is preferably more than 5 minutes.

Since the wide residence time distribution combined with the generally very short circulation times results in the discharge of a certain quantity of product after a very short residence time, the system may advantageously be modified such that a holding zone or discharge screw is installed at the discharge point, which ensures the necessary minimum residence time in the overall system under suitable thermal and/or atmospheric conditions.

If various partial stages are to be performed on the agglomerated material and if these may sensibly be separated (for example agglomeration, drying, thermal treatment), two or more heated apparatuses (circulating fluidised beds) may advantageously be used in series.

The heated apparatuses (circulating fluidised beds) may be heated directly or indirectly with a suitable fuel or electrically.

The production of hematite or maghemite from goethite, lepidocrocite, magnetite or starting materials substantially consisting of iron and oxygen, such as for example waste, effluent or residue pastes, preferably proceeds under oxidising conditions, wherein the quantity of oxygen in the exhaust gas should preferably be above 0.03 mol of oxygen per mol of iron processed.

For the production of a red pigment (hematite), thermal treatment may advantageously be performed at 700° to 950° C., while production of a brown pigment (maghemite) is preferably performed at 350° to 600° C.

For the production of black pigment (magnetite) from goethite, lepidocrocite, magnetite or starting materials substantially consisting of iron and oxygen, for example waste, effluent or residue pastes, thermal treatment is preferably performed under slightly oxidising, inert or reducing conditions, wherein the quantity of oxygen in the exhaust gas should preferably be between 0.0001 and 0.026 mol of oxygen per mol of iron processed.

In processes under reducing conditions, liquid or gaseous hydrocarbons, such as oils or natural gas, hard coal, lignite, activated carbon or hydrogen, are preferably used as the reducing agent.

For the production of magnetites, thermal treatment is preferably performed at 350° to 850° C., particularly preferably at 600° to 850° C.

If the process is performed under slightly oxidising or oxidising conditions, gases containing oxygen are preferably used as the oxidising agent.

The pigments which are produced by the process according to the invention by agglomeration and thermal after-treatment in a circulating fluidised bed and have average particle sizes between 0.05 and 10 mm, preferably between 0.1 and 1 mm, have the great advantage that they can be used directly for colouring inorganic or organic dispersions or building materials without any additional treatment steps such as grinding, etc. The products obtained using the circulating fluidised bed can however, if desired or necessary, also be ground in a subsequent step.

The following examples are intended to illustrate the invention in greater detail.

The data stated in the examples were obtained using the following test methods:

Colorimetric determination of colour distances according to DIN 6174 (CIELAB values) in barytes.

Tinting strength according to DIN 55 986; brightening test with five times the quantity by weight of the $TiO_2$ pigment Bayertitan R-KB 2; binder: Alkyldal L 64 lacquer, both commercial products of Bayer AG; equivalence criterion=brightness.

Oxidation stability (IMCO test): 1 liter of product is poured into an air-permeable phosphor bronze wire mesh cube of an edge length of 10 cm; the cube is placed in the centre of a laboratory oven with internal air circulation, heated to the test temperature and maintained at this temperature for 24 h. If a temperature of above 200° C. occurs within the sample, the sample is not stable at the selected test temperature.

Dispersibility: 3 wt. % of pigment, relative to the cement content, are added to a slightly moistened concrete roofing tile mix, mixed for 1 minute in a mixer, 10 cm×5 cm×2 cm roofing tiles are pressed at a pressure of 10 bar and hardened for 24 h at 35° C. and 90% relative atmospheric humidity. Colour intensity is then compared with an identically treated standard, the equivalence criterion being brightness.

Strength: 100 g of pigment are stressed in a rotating vessel provided with baffles for 5 minutes in a stream of air of 20 l/min. The air is passed through a filter and the quantity of solid remaining on the filter is weighed. This procedure is repeated 5 times with the individual and total quantities of pigment being recorded.

Particle size distribution (PSD): The pigment is stirred into distilled water at a concentration of approximately 2 g/l and measured in a Malvern Mastersizer using a 300×lens without being dispersed. The D[4.3] value (mean) is stated.

EXAMPLES

Comparative Example 1

Washed iron oxide black pastes with solids contents of 40 wt. % to 70 wt. % were used as the starting material. Two or more of these suspensions were agglomerated by spray drying. Gas inlet temperatures were between 400° and 530° C., the outlet temperature was adjusted such that residual moisture contents of 1% to 8% were obtained. Outlet temperatures of 80° to 140° C. were measured.

The freshly produced products were subjected to conventional testing for colour values (CIELAB system), particle size distribution (PSD/light scattering measurement, screening), strength (Dustmeter with additional baffles), dispersibility (colour development in a concrete roofing tile mix), oxidation stability (using the IMCO method) and the $Fe^{3+}/Fe^{2+}$ ratio. The measured values may be found in tables 1 and 2.

Comparative Example 2

Washed effluent pastes with a solids content of 50 wt. % were used as the starting material. These suspensions were agglomerated without a binder by spray drying. The gas inlet temperatures were between 410° and 520° C., the outlet temperature was adjusted such that residual moisture contents of 1% to 8% were obtained. Outlet temperatures of 80° to 120° C. were measured. In a further test, a product (2b) having a distinctly smaller average particle size was produced by reducing the solids content in the starting paste to 40 wt. % and increasing the rotational speed of the spray disk.

Product properties were determined as described in example 1 and may be found in tables 1 and 2.

Comparative Example 3

Spray-dried pigments were produced using the process described in example 1 and then heat treated for approximately 30 to 60 minutes in an indirectly heated rotary kiln at temperatures of between 650° and 800° C. under an inert ($N_2$) or slightly oxidising ($N_2$/air) atmosphere. The introduced gases were passed both co-currently and counter-currently relative to the direction of motion of the product. It was found that any possibly present organic residues were virtually completely incinerated/decomposed with co-current operation, wherein product properties were, however, not substantially different from counter-current operation.

Product properties were determined as described in example 1 and may be found in tables 1 and 2.

Comparative Example 4

Spray-dried pigments were produced using the process described in example 1 and then heat treated for approximately 30 to 60 minutes in a stationary fluidised bed reactor at a temperature of 800° C. under a slightly oxidising ($N_2$/air) atmosphere. It was found from the outset of testing that, with the wide particle size distribution (see table 3), approximately 45% of the product was discharged from the reactor under conditions allowing fluidisation of the larger aggregates as well. This unit thus proved unsuitable from the outset.

Example 5

The spray-dried material described in comparative example 1 was treated in an electrically heated circulating fluidised bed with a diameter of 200 mm and a height of 6000 mm under various temperature and atmospheric conditions with a residence time of approximately 30 minutes. The fluidised bed charge was 10 kg, the specific product throughput 20 kg/h and the combined gas load (i.e., the gas throughput of the individual gas streams in total) approximately 25 $Nm^3/h$, giving a gas velocity of approximately 1 m/s under the stated conditions. Relevant product properties may be found in tables 1 and 2.

As may be seen from the properties shown in the tables, it is entirely possible under suitable conditions to produce very good red, black and brown pigments from one and the same starting material in the same apparatus.

Example 6

The stoichiometric red pigment (5a) produced in example 5 was treated under the conditions described in example 5 at 750° C. and with the addition of 1 $Nm^3/h$ of air and 5 wt. % of heating oil, relative to the quantity of pigment introduced, the oil being injected into the lower zone of the fluidised bed reactor. It was found that it is also possible to reduce a highly heat-treated, stoichiometric red pigment to yield a good black pigment.

Relevant product properties may be found in tables 1 and 2.

Example 7

The spray-dried effluent paste described in comparative example 2 was treated under the conditions described in example 5 at 750° C. with different quantities of air. In some tests, 1.75% of heating oil, relative to the quantity of pigment, was additionally injected into the lower part of the fluidised bed reactor. As may be seen from the product properties shown in tables 1 and 2, excellent products may be produced from the effluent paste under optimum conditions, the properties of which sometimes even exceed those of some standard comparison products.

Example 8

The finely divided, spray-dried effluent paste described in comparative example 2 is treated under the conditions described in example 5 at 825° C. and a quantity of air of 24 $Nm^3/h$ (as in example 5e). The small average particle size (0.047 mm) resulted in an unexpected, sharply increased discharge of fines (10.6%) which was deposited in a filter. In all the other tests, the discharge was <0.4%.

TABLE 1

Properties of the products from examples 1 to 8; figures with + are excellent, with − inadequate.

| Example | Charge | T (°C.) | Air input (Nm³/h) | Oil input (kg/h) | PSD$_{(D4.3)}$ (mm) | Fe$^{2+}$ (%) | C (%) | S (%) | Specific surface area (m²/g) |
|---|---|---|---|---|---|---|---|---|---|
| 1a | — | — | — | — | — | 21.5 | 1.15 | 0.18 | 15.5 |
| 1b | — | — | — | — | 0.175 | 21.3 | 1.26 | 0.17 | 16.8 |
| 1c | — | — | — | — | — | 22.9 | 1.17 | 0.26 | 14.1 |
| 1d | — | — | — | — | 0.153 | 20.8 | 1.11 | 0.18 | 14.8 |
| 2a | — | — | — | — | 0.129 | 9.0⁻ | 1.02 | 0.48⁻ | 15.1⁻ |
| 2b | — | — | — | — | 0.047⁻ | 11.2 | 1.08 | 0.37 | 17.3 |
| 3a | 1a | 300 | 0 | — | — | 22.0 | 0.96 | 0.18 | 18.3⁻ |
| 3b | 1a | 400 | 0 | — | — | 21.6 | 0.94 | 0.18 | 17.5⁻ |
| 3c | 1a | 500 | 0 | — | — | 21.8 | 0.74 | 0.17 | 16.8⁻ |
| 3d | 1a | 600 | 0 | — | — | 22.7 | 0.67 | 0.18 | 15.5 |
| 3e | 1a | 700 | 3.0 | — | — | 20.0 | 0.62 | 0.16 | 13.6 |
| 5a | 1d | 700 | 13.5 | — | — | — | 0.05 | 0.15 | 10.7 |
| 5b | 1d | 750 | 23.5 | — | — | — | 0.03 | 0.10 | 9.8 |
| 5c | 1d | 800 | 23.5 | — | — | — | 0.02 | 0.08 | 9.1 |
| 5d | 1d | 825 | 23.5 | — | — | — | 0.02 | 0.09 | 8.8 |
| 5e | 1d | 825 | 24 | — | — | — | 0.02 | 0.08 | 8.5 |
| 5f | 1b | 700 | 0.5 | — | 0.225 | 23.3 | 0.78 | 0.15 | 11.0 |
| 5g | 1b | 825 | 0.5 | — | 0.251 | 22.1 | 0.7 | 0.15 | 10.8 |
| 5h | 1c | 725 | 0.2 | — | — | 25.9⁻ | 0.53 | 0.19 | 12.2 |
| 5i | 1c | 775 | 0.8 | — | — | 24.5 | 0.54 | 0.18 | 13.0 |
| 5j | 1c | 800 | 0.8 | — | — | 23.9 | 0.47 | 0.16 | 12.4 |
| 5k | 1c | 800 | 1.0 | — | — | 22.2 | 0.40⁺ | 0.16 | 11.9 |
| 5l | 1c | 800 | 1.2 | — | — | 20.6 | 0.39⁺ | 0.15⁺ | 12.0 |
| 5m | 1c | 825 | 0.8 | — | — | 24.0 | 0.43 | 0.14 | 11.2 |
| 5n | 1c | 825 | 1.5 | — | — | 18.9⁻ | 0.39 | 0.16 | 11.0 |
| 5o | 1c | 825 | 2.0 | — | — | 16.3⁻ | 0.45 | 0.14 | 10.6 |
| 6a | 5b | 750 | 2.0 | 0.75 | — | 19.1⁻ | 0.1⁺ | 0.08⁺ | 8.8 |
| 6b | 5b | 750 | 1.0 | 1.0 | — | 20.5 | 0.13⁺ | 0.045⁺ | — |
| 6c | 5b | 750 | 1.0 | 1.0 | — | 21.2 | 0.13⁺ | 0.042⁺ | — |
| 7a | 2a | 400 | 25 | — | — | 0 | 0.87 | 0.42 | 19.6 |
| 7b | 2a | 500 | 25 | — | — | 0 | 0.77 | 0.39 | 16.8 |
| 7c | 2a | 600 | 25 | — | — | 0 | 0.61 | 0.35 | 13.4 |
| 7d | 2a | 750 | 0 | — | 0.149 | 16.4⁻ | 0.57 | 0.33 | 7.5 |
| 7e | 2a | 750 | 1.0 | 0.5 | 0.141 | 19.5 | 0.55 | 0.31 | 6.2⁺ |
| 7f | 2a | 750 | 2.2 | 0.5 | 0.135 | 20.7 | 0.49 | 0.30 | 4.8⁺ |
| 8 | 2b | 825 | 24 | — | —* | — | 0.02 | 0.16 | — |

*Due to excessively small average particle size, the filtered quantity rose from <0.4% to 10.6%.

TABLE 2

Properties of the products from examples 1 to 7.
The stated grades of Bayferrox were used as reference *.

| Example | Colour values a* | Colour values b* | F$_{rel.}$ (%) | Reference* | IMCO (°C.) | Exhaust gas (vol. %) O$_2$ | CO | CO$_2$ | NO$_x$ |
|---|---|---|---|---|---|---|---|---|---|
| 1a | −0.2 | −0.4 | 89 | 330 | 120⁻ | — | — | — | — |
| 1b | −0.4 | −0.8 | 111 | 330 | 110⁻ | — | — | — | — |
| 1c | −0.1 | −1.0 | 110 | 330 | 120⁻ | — | — | — | — |
| 1d | −0.5 | −1.2 | 110 | 330 | 120⁻ | — | — | — | — |
| 2 | −0.1 | 7.6 | 36 | 330 | 140 | — | — | — | — |
| 3a | — | −2.0 | 95 | 330 | 120⁻ | — | — | — | — |
| 3b | — | −2.4⁺ | 94 | 330 | 120⁻ | — | — | — | — |
| 3c | — | −2.6⁺ | 91 | 330 | 120⁻ | — | — | — | — |
| 3d | — | −3.3⁺ | 90 | 330 | 120⁻ | — | — | — | — |
| 3e | — | −2.3 | 95 | 330 | 140 | 2.1 | 0.076 | 12.2 | 0.0022 |
| 5a | −2.4 | 2.2 | 91 | 130 | — | 19 | — | — | 0.0035 |
| 5b | 0.3 | 1.9 | 107 | 130 | — | 19 | — | — | — |
| 5c | 0.4 | 2.1 | 107 | 130 | — | 19 | — | — | — |
| 5d | 0.3 | 1.7 | 109 | 130 | — | 19 | — | — | 0.0045 |
| 5e | 0.3 | 1.8 | 110 | 130 | — | 6 | — | — | 0.004 |
| 5f | −0.7⁺ | −2.5⁺ | 97 | 330 | 140 | 0.2 | 0.038 | 1.1 | 0.0004 |
| 5g | −0.7⁺ | −2.4⁺ | 107 | 330 | 150 | 0.2 | 0.055 | 1.1 | 0.0001 |
| 5h | −0.5 | −1.9 | 119 | 330 | 140 | 0.3 | 0.050 | 0.7 | 0.0 |
| 5l | −0.4⁺ | −2.1⁺ | 125⁺ | 330 | 140 | 0.3 | 0.060 | 0.9 | 0.003 |

TABLE 2-continued

Properties of the products from examples 1 to 7.
The stated grades of Bayferrox were used as reference *.

| Example | Colour values | | $F_{rel.}$ (%) | Reference* | IMCO (°C.) | Exhaust gas (vol. %) | | | |
|---|---|---|---|---|---|---|---|---|---|
| | a* | b* | | | | $O_2$ | CO | $CO_2$ | $NO_x$ |
| 5j | −0.5+ | −2.1+ | 128+ | 330 | 140 | 0.4 | 0.065 | 0.7 | 0.0043 |
| 5k | 0.0 | −1.6 | 124+ | 330 | 150+ | 0.2 | 0.12 | 0.8 | 0.0062 |
| 5l | 0.5 | −1.2 | 115 | 330 | 150+ | 0.2 | 0.125 | 0.9 | 0.0067 |
| 5m | −0.5 | −2.1 | 112 | 330 | 140 | 0.4 | 0.10 | 0.8 | 0.0054 |
| 5n | — | Rot | — | — | — | 0.5− | 0.085 | 0.8 | 0.007 |
| 5o | — | Rot | — | — | — | 0.6− | 0.060 | 0.7 | 0.0049 |
| 6a | 1.9 | −0.9 | 83− | 330 | 150 | 0.03 | 0.35 | 2.0 | 0.0001 |
| 6b | 1.2 | −1.3 | 97 | 330 | 150 | 0.01 | 0.38 | 1.4 | 0.0003 |
| 6c | 0.6 | −1.8 | 99 | 330 | 150 | 0.008 | 0.39 | 1.8 | 0.0002 |
| 7a | 0.2 | −1.0 | 86 | 610 | — | — | — | — | — |
| 7b | 0.3 | −1.3 | 89 | 610 | — | — | — | — | — |
| 7c | 0.4 | −1.1 | 91 | 610 | — | — | — | — | — |
| 7d | 0.5− | −0.4 | 58 | 330 | 150 | 0.1 | 0.0055 | 1.0 | 0.018 |
| 7e | 0.3 | −0.3+ | 139+ | 306 | 150 | 0.04 | 0.20 | 2.5 | 0.0 |
| | −0.3 | −2.3+ | 96+ | 318 | 150 | — | — | — | — |
| 7f | 0.0+ | −1.0+ | 128+ | 306 | 160+ | 0.09 | 0.025 | 2.4 | 0.0004 |
| | −0.6+ | −3.0+ | 91+ | 318 | 160+ | — | — | — | — |

− inadequate
+ excellent

TABLE 3

Particle size distribution of the pigment agglomerate used in example 4

| Fraction (μm): | >355 | 250–355 | 200–250 | 100–200 | <100 | Σ |
|---|---|---|---|---|---|---|
| 1st measurement (wt.-%): | 13.2 | 30.6 | 17.9 | 27.6 | 9.2 | 98.5 |
| 2nd measurement (wt.-%): | 12.9 | 28.3 | 18.2 | 28.8 | 9.7 | 98.9 |

What is claimed is:

1. Process for the production of iron oxide pigments, said process comprising agglomerating at least one material having an average primary particle size of ≦10 μm and selected from the group consisting essentially of iron (II) oxides, iron (II) hydroxides, iron (II) oxyhydroxides, iron (III) oxides, iron (III) hydroxides, iron (III) oxyhydroxides, iron (II,III) oxides, iron (II,III) hydroxides or, iron (II,III) oxyhydroxides and thermally treating said agglomerated material in a system consisting essentially of a first heated apparatus and a second, down-stream apparatus, wherein in said first heated apparatus the material is fluidized by an upwardly directed gas mixture with a gas velocity of from about 0.5 to 1 m/s in such a manner that a gas/solid flow is formed, the resultant gas/solid mixture flows from the bottom upwards through the heated apparatus and is separated into gas and solid components in said second, down-stream apparatus, in which a portion of the solid components are discharged and the remaining solid components are returned to the first heated apparatus, further wherein the gas/solid ratio in the heated apparatus is adjusted to 200 to 1,300 $Nm^3$/t of solid.

2. Process according to claim 1, wherein a portion of the separated gas components are discharged and the remaining gas components are returned to the first heated apparatus.

3. Process according to claim 1, wherein the material is washed before it is agglomerated.

4. Process according to claim 3, wherein the material is formed into agglomerates by spraying or atomization.

5. Process according to claim 3, wherein the material is formed into agglomerates having an average particle size of 0.1 to 1 mm.

6. Process according to claim 1, wherein the average residence time of the solid in the system is between 5 and 30 minutes.

7. Process for the production of iron oxide pigments, said process comprising agglomerating at least one material having an average primary particle size of ≦10 μm and selected from the group consisting of iron (II) oxides, iron (II) hydroxides, iron (II) oxyhydroxides, iron (III) oxides, iron (III) hydroxides, iron (III) oxyhydroxides, iron (II,III) oxides, iron (II,III) hydroxides or iron (II,III) oxyhydroxides and thermally treating said agglomerated material in a system consisting essentially of at least two heated apparatuses connected in series and a down-stream apparatus, wherein in said heated apparatuses the material is fluidized by an upwardly directed gas mixture with a gas velocity of from about 0.5 to 1 m/s in such a manner that a gas/solid flow is formed, the resultant gas/solid mixture flows from the bottom upwards through the heated apparatuses and is separated into gas and solid components in said down-stream apparatus, in which a portion of the solid components are discharged and the remaining solid components are returned to the heated apparatuses.

8. Process according to claim 2, wherein the thermal treatment proceeds under oxidising conditions and the separated gas components that are discharged contain a quantity of oxygen that is above 0.03 mol of oxygen per mol of iron processed.

9. Process according to claim 8, wherein, for production of a red pigment, the thermal treatment is performed at 700° to 950° C.

10. Process according to claim 8, wherein, for production of a brown pigment, the thermal treatment is performed at 350° to 600° C.

11. Process according to claim 2, wherein the thermal treatment is performed under slightly oxidizing, inert or reducing conditions and the separated gas components that are discharged contain a quantity of oxygen that is between 0.0001 and 0.026 mol of oxygen per mol of iron processed.

12. Process according to claim 11, wherein the thermal treatment is performed under reducing conditions and at least one liquid or gaseous hydrocarbon selected from the group consisting of oils, natural gas, hard coal, lignite, activated carbon or hydrogen, is used as the reducing agent.

13. Process according to claim 11, wherein the thermal treatment is performed at 350° to 850° C.

14. Process according to claim 11, wherein thermal treatment is performed at 600° to 850° C.

15. Process according to claim 8, wherein the thermal treatment is performed under oxidizing conditions and at least one gas containing oxygen is used as the oxidizing agent.

16. A method of using the pigment agglomerates produced according to the process of claim 1, wherein said pigment agglomerates are added to inorganic or organic dispersions or building materials to color the dispersions or building materials.

17. Process according to claim 7, wherein the average residence time of the solid in the system is between 5 and 30 minutes.

* * * * *